United States Patent
Sakai

(10) Patent No.: US 11,780,731 B2
(45) Date of Patent: Oct. 10, 2023

(54) CARBON NANOTUBE WIRE

(71) Applicant: Furukawa Electric Co., Ltd., Tokyo (JP)

(72) Inventor: Sawa Sakai, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 124 days.

(21) Appl. No.: 17/037,306

(22) Filed: Sep. 29, 2020

(65) Prior Publication Data

US 2021/0009420 A1 Jan. 14, 2021

Related U.S. Application Data

(63) Continuation of application No. PCT/JP2019/014193, filed on Mar. 29, 2019.

(30) Foreign Application Priority Data

Mar. 30, 2018 (JP) .................. 2018-069826

(51) Int. Cl.
*H01B 1/04* (2006.01)
*B82Y 30/00* (2011.01)
*C01B 32/158* (2017.01)

(52) U.S. Cl.
CPC ............. *C01B 32/158* (2017.08); *H01B 1/04* (2013.01); *B82Y 30/00* (2013.01);
(Continued)

(58) Field of Classification Search
CPC ... C01B 32/158; C01B 32/168; C01B 32/172; C01B 2202/34; C01B 2202/36;
(Continued)

(56) References Cited

U.S. PATENT DOCUMENTS

2005/0006801 A1 1/2005 Kinloch. et al.
2008/0170982 A1 7/2008 Zhang et al.
(Continued)

FOREIGN PATENT DOCUMENTS

CN 101600650 A 12/2009
CN 101609726 B * 6/2011
(Continued)

OTHER PUBLICATIONS

English translation of International Preliminary Report on Patentability for Application No. PCT/JP2019/014193, dated Oct. 6, 2020.
(Continued)

*Primary Examiner* — Tri V Nguyen
(74) *Attorney, Agent, or Firm* — Dorsey & Whitney LLP

(57) ABSTRACT

The present disclosure relates to a carbon nanotube wire includes a carbon nanotube aggregate constituted of a plurality of carbon nanotubes. In the plurality of carbon nanotubes, a mean length of the plurality of carbon nanotubes is not larger than 150 μm, a CV value of the mean length is not smaller than 0.40, a mean diameter of the plurality of carbon nanotubes is smaller than 4 nm, a CV value of the mean diameter is not smaller than 0.18, and a proportion of carbon nanotubes with lengths not smaller than 3 μm is not less than 60%.

6 Claims, 5 Drawing Sheets

(52) U.S. Cl.
CPC ...... *C01B 2202/34* (2013.01); *C01B 2202/36* (2013.01); *C01P 2004/50* (2013.01); *C01P 2006/10* (2013.01)

(58) Field of Classification Search
CPC ............. C01B 2202/22; C01B 2202/26; C01P 2004/50; C01P 2006/10; H01B 1/04; B82Y 30/00
USPC .................................. 428/367; 252/500, 506
See application file for complete search history.

(56) References Cited

U.S. PATENT DOCUMENTS

| | | |
|---|---|---|
| 2008/0217588 A1 | 9/2008 | Arnold et al. |
| 2009/0186223 A1 | 7/2009 | Saito et al. |
| 2011/0155964 A1 | 6/2011 | Arnold et al. |
| 2012/0183770 A1 | 7/2012 | Bosnyak et al. |
| 2013/0251619 A1 | 9/2013 | Rikihisa et al. |
| 2013/0337707 A1 | 12/2013 | Hata et al. |
| 2014/0039309 A1 | 2/2014 | Harris et al. |
| 2014/0046291 A1 | 2/2014 | Harris et al. |
| 2014/0084219 A1 | 3/2014 | Zhao et al. |
| 2014/0315120 A1 | 10/2014 | Imanishi et al. |
| 2014/0346697 A1 | 11/2014 | Rikihisa et al. |
| 2014/0363669 A1 | 12/2014 | Otto et al. |
| 2015/0147573 A1 | 5/2015 | Zhang et al. |
| 2015/0308018 A1 | 10/2015 | Zhang et al. |
| 2016/0083872 A1 | 3/2016 | Zhang et al. |
| 2016/0135687 A1 | 5/2016 | Harris et al. |
| 2016/0251778 A1 | 9/2016 | Zhang et al. |
| 2016/0273133 A1 | 9/2016 | Zhang et al. |
| 2016/0312387 A1 | 10/2016 | Zhang et al. |
| 2017/0001866 A1 | 1/2017 | Zhang et al. |
| 2017/0096750 A1 | 4/2017 | Zhang et al. |
| 2017/0114210 A1 | 4/2017 | Bosnyak et al. |
| 2017/0137290 A1 | 5/2017 | Zhang et al. |
| 2017/0327377 A1 | 11/2017 | Zhang et al. |
| 2018/0016146 A1 | 1/2018 | Hata et al. |
| 2018/0170757 A1 | 6/2018 | Watanabe et al. |
| 2018/0251371 A1 | 9/2018 | Arnold et al. |
| 2019/0002283 A1 | 1/2019 | Zhang et al. |
| 2019/0031512 A1 | 1/2019 | Kazama et al. |
| 2021/0071320 A1* | 3/2021 | Mukai ...................... D02G 3/16 |
| 2021/0139232 A1 | 5/2021 | Goose et al. |

FOREIGN PATENT DOCUMENTS

| | | | | |
|---|---|---|---|---|
| CN | 103189308 A | 7/2013 | | |
| CN | 103261091 A | 8/2013 | | |
| CN | 103998374 A | 8/2014 | | |
| EP | 2025643 A1 | 2/2009 | | |
| JP | 5131571 B2 | 11/2012 | | |
| JP | 5135620 B2 | 11/2012 | | |
| JP | 5288359 B2 | 6/2013 | | |
| JP | 5350635 B2 | 8/2013 | | |
| JP | 2013212980 A | 10/2013 | | |
| JP | 5590603 B2 | 8/2014 | | |
| JP | 2014530964 A | 11/2014 | | |
| JP | 5819888 B2 | 10/2015 | | |
| JP | 5990202 B2 | 8/2016 | | |
| JP | 2017171545 A | 9/2017 | | |
| JP | 2017171546 A | 9/2017 | | |
| WO | WO-2011020568 A1 * | 2/2011 | ............ | B01J 20/205 |
| WO | 2017033482 A1 | 3/2017 | | |
| WO | 2017164249 A1 | 9/2017 | | |
| WO | WO-2019074072 A1 * | 4/2019 | ............ | C01B 32/168 |

OTHER PUBLICATIONS

English translation of Written Opinion for Application No. PCT/JP2019/014193, dated Jun. 18, 2019.
Extended European Search Report dated Nov. 26, 2021 for European Patent Application No. 19776773.4.
Mayhew, Eric et al., "Thermal conductivity of high performance carbon nanotube yarn-like fibers", Journal of Applied Physics, American Institute of Physics, 2 Huntington Quadrangle, Melville, NY 11747, vol. 115, No. 17, May 7, 2014, 9 pages.
Wu, Xueli et al., "Relationship between Mechanical and Electrical Properties of Continuous Polymer-Free Carbon Nanotube Fibers by Wet-Spinning Method and Nanotube-Length Estimated by Far-Infrared Spectroscopy", The Journal of Physical Chemistry C, vol. 120, No. 36, XP055862313, Sep. 15, 2016, pp. 20419-20427.
Zhao, Yao , "Iodine doped carbon nanotube cables exceeding specific electrical conductivity of metals", Scientific Reports, vol. 1, No. 83, XP055250585; and Supplemental information, Sep. 6, 2011, pp. 1-15.
International Search Report and Written Opinion (EN translation of ISR only) for Application No. PCT/JP2019/014193, dated Jun. 18, 2019.
[English Translation] Notice of Reasons for Refusal dated Aug. 23, 2022 in JP application No. 2020-511132; pp. all.
[English Translation] First Office Action dated Nov. 3, 2022 in CN application No. 201980022641.8; pp. all.
[English Translation] Second Office Action dated May 31, 2023 in CN Application No. 201980022641.8; pp. all.

* cited by examiner

CARBON NANOTUBE WIRE

CROSS REFERENCE TO RELATED APPLICATIONS

The present application is a continuation application of International Patent Application No. PCT/JP2019/014193 filed on Mar. 29, 2019, which claims the benefit of Japanese Patent Application No. 2018-069826, filed on Mar. 30, 2018. The contents of these applications are incorporated herein by reference in their entirety.

BACKGROUND

Technical Field

The present disclosure relates to a carbon nanotube wire includes a carbon nanotube aggregate constituted of a plurality of carbon nanotubes.

Description of the Related Art

Carbon nanotubes (each hereinafter occasionally referred to as "CNT") are material having various characteristics and promise applications to many fields.

For example, since in addition to being light in weight, CNTs have excellent characteristics such as electroconductivity, thermoconductivity and strength, it can be considered to use CNTs as a material of wires.

Meanwhile, when CNTs are used as a wire, a carbon nanotube wire (hereinafter occasionally referred to as "CNT wire") is formed of a carbon nanotube aggregate (hereinafter occasionally referred to as "CNT aggregate") obtained by packing of a plurality of CNTs. In this case, it is ideal that gaps between the CNTs are as small as possible in order to enhance strength and the CNTs are aligned and oriented in one direction in order to enhance electroconductivity.

For example, it is considered that by using CNTs with small diameters, the CNTs can be packed at a high density and high electroconductivity can be obtained. It is needed for all the CNTs to be aligned and oriented in one direction in order to realize such a CNT wire exhibiting high electroconductivity. It is however technically very difficult to align and orient all the CNTs in one direction. Moreover, it is inferred that the CNTs are oriented at random and many gaps exist between the CNTs in reality.

Japanese Patent Application Publication No. 2013-212980 discloses a technology of forming CNTs into a wire under an environment where compressive stress is exerted, and thereby, increasing areas of and contact pressures at contact portions between the CNTs to enhance electroconductivity of the wire. Orientation in a longitudinal direction of a CNT wire however cannot be enhanced even when compressive stress is exerted from the outside. Therefore, electroconductivity tends to have a dispersion, and particularly when CNTs with small diameters which can exhibit random orientation are used, this tendency is problematically significant.

It is considered that by exemplarily using CNTs large in length, which is a factor of CNTs other than a diameter, as shown in FIG. 5A, electric conduction paths can be enhanced to improve electroconductivity. It is however predicted that only such long CNTs cause gaps between the CNTs to be large as shown in FIG. 5B, packing is sparse and strength is poor.

On the other hand, it is considered that by exemplarily using short CNTs as shown in FIG. 6A, the CNTs can be packed at a high density similarly to the use of CNTs with small diameters. It is however predicted that electroconductivity in a lengthwise direction (longitudinal direction) of the CNT wire is poor since electric conduction paths in the longitudinal direction are short as shown in FIG. 6B.

SUMMARY

The present disclosure is related to providing a carbon nanotube wire which is excellent in strength and electroconductivity and in which carbon nanotubes are packed at a high density.

According to an aspect of the present disclosure, a carbon nanotube wire includes a carbon nanotube aggregate constituted of a plurality of carbon nanotubes. In the plurality of carbon nanotubes, a mean length of the plurality of carbon nanotubes is not larger than 150 μm, a CV value of the mean length is not smaller than 0.40, a mean diameter of the plurality of carbon nanotubes is smaller than 4 nm, a CV value of the mean diameter is not smaller than 0.18, and a proportion of carbon nanotubes with lengths not smaller than 3 μm is not less than 60%.

According to one aspect of the present disclosure, the mean length of the plurality of carbon nanotubes is not smaller than 1 μm.

According to one aspect of the present disclosure, a density in the carbon nanotube wire is not lower than 0.5 g/cm$^3$.

According to h one aspect of the present disclosure, in the plurality of carbon nanotubes, the CV value of the mean length is not larger than 1.2, the mean diameter is not smaller than 1 nm, the CV value of the mean diameter is not larger than 0.80, and the proportion of carbon nanotubes with lengths not smaller than 3 μm is not more than 95%.

According to one aspect of the present disclosure, in the plurality of carbon nanotubes, the CV value of the mean length is not smaller than 0.70, the mean diameter is not smaller than 1.2 nm, the CV value of the mean diameter is not smaller than 0.50 and not larger than 0.80, and the proportion of carbon nanotubes with lengths not smaller than 3 μm is not less than 70% and not more than 95%.

According to one aspect of the present disclosure, the carbon nanotube wire is a single wire.

According to the present disclosure, a carbon nanotube wire which is excellent in strength and electroconductivity and in which the carbon nanotubes are packed at a high density can be provided.

DETAILED DESCRIPTION

Hereinafter, a carbon nanotube wire according to an exemplary embodiment of the present disclosure will be described in detail with use of the drawings.

<Carbon Nanotube Wire>

Figure 1:
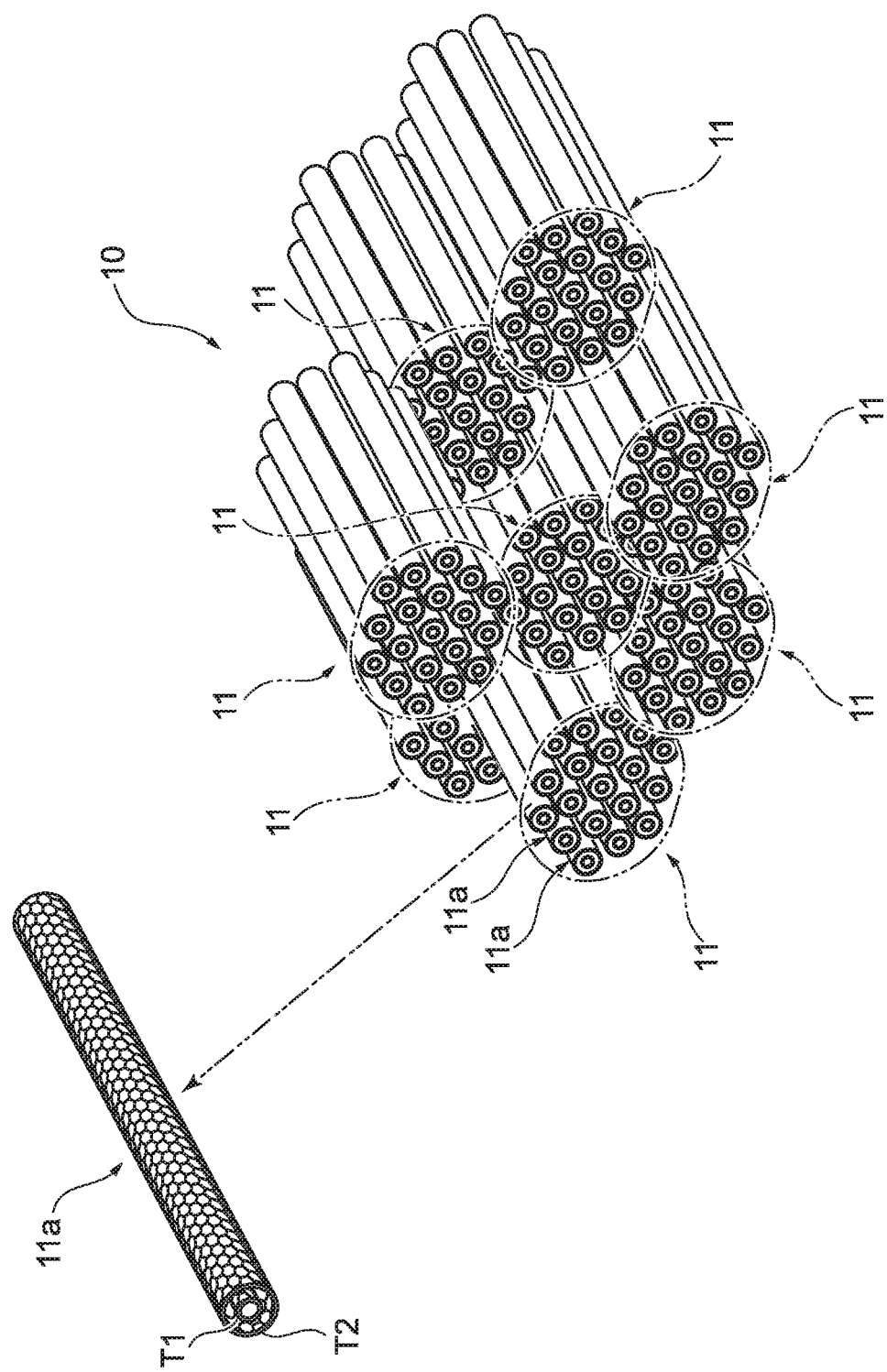
FIG. 1 is a schematic view exemplarily showing a configuration of a carbon nanotube wire according to an exemplary embodiment of the present disclosure.

As shown in FIG. 1, a carbon nanotube wire 10 according to the present disclosure includes CNT aggregates 11 each constituted of a plurality of CNTs 11a, 11a, . . . . The CNT aggregate 11 is constituted of the plurality of CNTs 11a, 11a, . . . each having a wall structure with one or more walls, and the CNT wire 10 is formed of a single CNT aggregate 11 or by a plurality of CNT aggregates 11 being bundled. Herein, the CNT wire means a CNT wire in which a ratio of CNTs is 90 mass % or more. Note that plating and dopants are excluded from calculation of the CNT proportion in the CNT wire. Since longitudinal directions of the CNT aggregates 11 form a longitudinal direction of the CNT wire 10, the CNT aggregates 11 are linear. The plurality of CNT aggregates 11, 11, . . . in the CNT wire 10 are oriented such that their longitudinal axis directions are substantially uniform. While the CNT wire 10 may be a single wire (element wire) composed of one CNT wire 10 or may be in a state of a twisted wire obtained by twisting a plurality of CNT wires 10 together, it is preferably a single wire in view of orientation. Moreover, by bringing the CNT wire 10 into a form of a twisted wire, an equivalent circle diameter and/or a sectional area of the CNT wire 10 can be properly adjusted. The equivalent circle diameter of the CNT wire 10 that is a single wire is not specially limited and is exemplarily not smaller than 0.01 mm and not larger than 4.0 mm. Moreover, the equivalent circle diameter of the CNT wire 10 that is a twisted wire is not specially limited and is exemplarily not smaller than 0.1 mm and not larger than 15 mm.

[CNT Aggregates]

The CNT aggregate 11 is a bundle of a plurality of CNTs 11a, and longitudinal directions of the CNTs 11a form the longitudinal direction of the CNT aggregate 11. The plurality of CNTs 11a, 11a, . . . in the CNT aggregate 11 are oriented such that their longitudinal axis directions are substantially uniform. An equivalent circle diameter of the CNT aggregate 11 is exemplarily not smaller than 20 nm and not larger than 1000 nm, more typically not smaller than 20 nm and not larger than 80 nm.

[CNTs]

The CNTs 11a constituting the CNT aggregate 11 are a substance in each of which a cylindrical body which has a single-walled structure or a multi-walled structure is formed to be thread-like, and a CNT with the single-walled structure is called a SWNT (single-walled nanotube) and a CNT with the multi-walled structure is called a MWNT (multi-walled nanotube). While in FIG. 1, only CNTs 11a having double-walled structures are presented for convenience, CNTs having triple-walled structures or CNTs having wall structures having structures with single walls may also be contained in the CNT aggregate 11, which may be formed of CNTs having triple-walled structures or CNTs having wall structures having structures with single walls. It should be noted that if CNTs have structures with four or more walls, a size and a distribution of diameters of the CNTs are large and it is difficult to orient those in a predetermined dispersion. Therefore, the CNTs preferably have the single-walled structures, the double-walled structures, or the triple-walled structures, still preferably the single-walled structures or the double-walled structures.

The CNT 11a having a double-walled structure is a three-dimensional mesh structure body in which two cylindrical bodies T1 and T2 each having a mesh structure with hexagonal lattices are substantially coaxially arranged, and is called a DWNT (double-walled nanotube). Each of the hexagonal lattices which are structure units is a six-membered ring at the vertices of which carbon atoms are arranged, and these are continuously connected such that one six-membered ring is adjacent to another.

[Lengths of CNTs]

Thereafter, lengths of the CNTs 11a in the CNT wire 10 are described.

For the plurality of CNTs 11a, 11a, . . . , a mean length of the plurality of CNTs 11a, 11a, . . . (hereinafter also simply referred to as "mean length") is not larger than 150 µm. When the mean length is larger than 150 µm, there arise large gaps between the plurality of CNTs 11a, 11a, . . . since short CNTs are too few. Therefore, packing of the plurality of CNTs 11a, 11a, . . . is sparse and high strength cannot be obtained. Moreover, based on the packing being sparse, contact areas between the plurality of CNTs 11a, 11a, . . . are small and electroconductivity results in being poor. Hence, by the mean length being not larger than 150 µm, the CNT wire 10 which is excellent in strength and electroconductivity and in which the plurality of CNTs 11a, 11a, . . . are packed at a high density can be obtained. Meanwhile, a lower limit value of the mean length is preferably not smaller than 1 µm, still preferably not smaller than 3 µm, further preferably not smaller than 8 µm. When the mean length is smaller than 1 µm, electric conduction paths in a lengthwise direction (longitudinal direction) are short since long CNTs are too few, and it tends to be difficult to obtain excellent electroconductivity. Moreover, as the lengths of CNTs are larger, the CNTs more tend to intertangle to form links and more tend to be densely packed stably along the lengthwise direction of the CNT wire (longitudinal direction). On the other hand, when long CNTs are too few, links between the long CNTs are few. By the mean length being not smaller than 1 µm, dense packing stable along the lengthwise direction of the CNT wire is easy, and accordingly, high strength can be also achieved.

For the plurality of CNTs 11a, 11a, . . . , a CV value (coefficient of variation) of the mean length is not smaller than 0.40, preferably not smaller than 0.70. Herein, the CV value of the mean length means a degree of a standard deviation with respect to the mean length, and specifically, denotes (dispersion of values of the mean length)$^{1/2}$ with respect to the mean length of the plurality of CNTs 11a, 11a, . . . . The CV value of the mean length can be calculated by expression (1) below, a smaller CV value of the mean length means that the plurality of CNTs 11a, 11a, . . . tend to be more monodisperse, and a larger CV value of the mean length means that the plurality of CNTs 11a, 11a, . . . tend to be more polydisperse. Since the CV value of the mean length being smaller than 0.40 indicates being too monodisperse and a dispersion of long CNTs and short CNTs is small, short CNTs cannot be sufficiently embedded in gaps between long CNTs. Therefore, packing of the plurality of CNTs 11a, 11a, . . . is sparse and excellent strength cannot be obtained. Moreover, since based on the packing being sparse, contact areas between the plurality of CNTs 11a, 11a, . . . are small, electroconductivity results in being poor.

Hence, by the CV value of the mean length being not smaller than 0.40, the CNT wire 10 which is excellent in strength and electroconductivity and in which the plurality of CNTs 11a, 11a, . . . are packed at a high density can be obtained. Moreover, when the CV value of the mean length is not smaller than 0.70, packing of the plurality of CNTs 11a, 11a, . . . is denser, and based on the packing being highly denser, strength and electroconductivity significantly goes up. Meanwhile, an upper limit value of the CV value of the mean length is preferably not larger than 1.2. Since when the CV value of the mean length is larger than 1.2, a dispersion of the mean length is too large despite of polydispersion, the CNTs tend to be oriented at random and gaps between the CNTs tend to be many.

$$\text{CV value of the mean length=standard deviation÷mean length} \quad (1)$$

For the plurality of CNTs 11a, 11a, . . . , a proportion of carbon nanotubes with lengths not smaller than 3 μm is not less than 60%, preferably not less than 70%. The proportion means a proportion of the number of the carbon nanotubes with lengths not smaller than 3 μm relative to the total number of the plurality of CNTs 11a, 11a, . . . . When the proportion is less than 60%, since relatively long CNTs not shorter than 3 μm are too few, the electric conduction paths in the lengthwise direction are short and excellent electroconductivity cannot be obtained. Moreover, since links between the long CNTs are few, dense packing stable along the lengthwise direction of the CNT wire is difficult, and accordingly, excellent strength cannot be obtained. Hence, by the proportion of CNTs with lengths not smaller than 3 μm being not less than 60%, the CNT wire 10 which is excellent in strength and electroconductivity and in which the plurality of CNTs 11a, 11a, . . . are packed at a high density can be obtained. Meanwhile, an upper limit value of the proportion is preferably not larger than 95%. Since when the proportion is more than 95%, short CNTs are too few, large gaps tend to arise between the plurality of CNTs 11a, 11a . . . . Therefore, packing of the plurality of CNTs 11a, 11a, . . . tends to be sparse and contact areas between the plurality of CNTs 11a, 11a, . . . are small, and high electroconductivity scarcely tends to be obtained.

Figure 2:
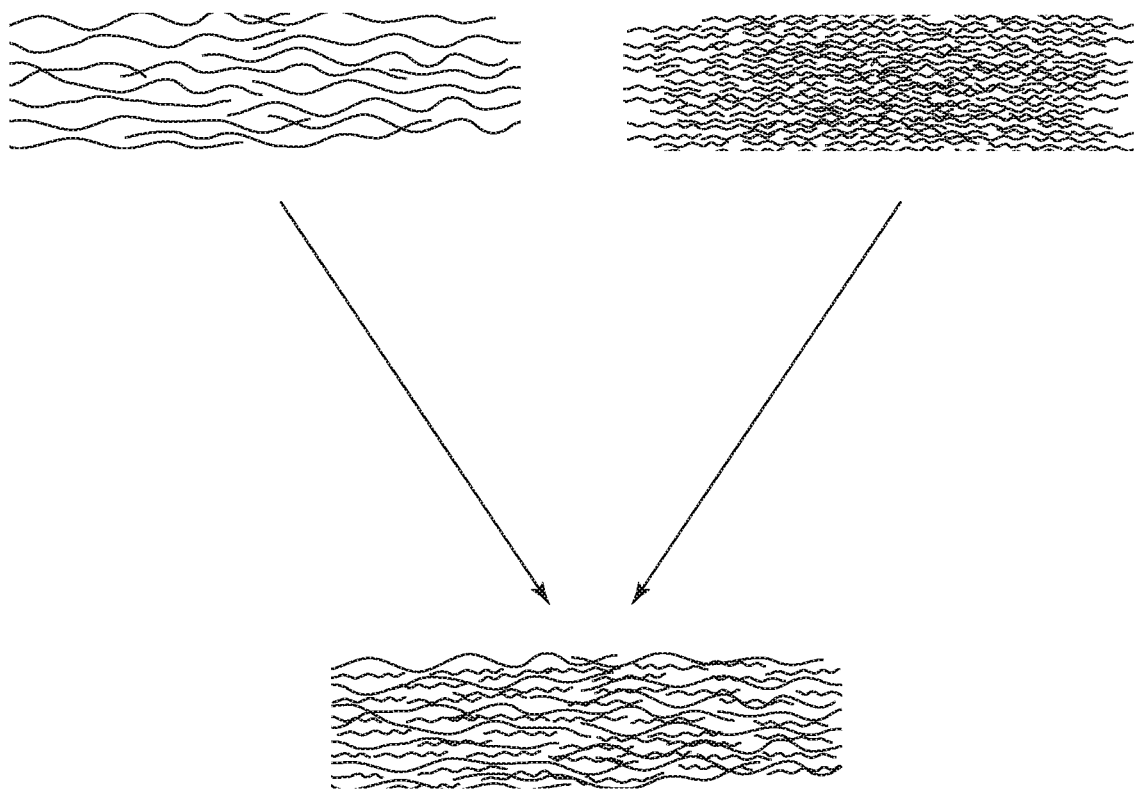
FIG. 2 is a schematic view exemplarily showing a state where carbon nanotubes with different lengths are dispersed in a carbon nanotube wire according to an exemplary embodiment of the present disclosure.

As above, by controlling the mean length, the CV value of the mean length, and the proportion of carbon nanotubes with lengths not smaller than 3 μm for the plurality of CNTs 11a, 11a, . . . , as exemplarily shown in FIG. 2, short CNTs can be appropriately embedded in gaps between long CNTs. Thereby, packing of the plurality of CNTs 11a, 11a, . . . can be made dense, in addition, dense packing stable along the lengthwise direction of the CNT wire can be easily made, and excellent strength can be obtained. Moreover, since long CNTs and short CNTs contact each other and contact areas between the plurality of CNTs 11a, 11a, . . . increase in the lengthwise direction, excellent electroconductivity is given.

[Diameters of CNTs]

Thereafter, diameters of the CNTs 11a in the CNT wire 10 are described.

For the plurality of CNTs 11a, 11a, . . . , a mean diameter of the plurality of CNTs 11a, 11a, . . . (hereinafter also simply referred to as "mean diameter") is smaller than 4 nm. When the mean diameter is not smaller than 4 nm, CNTs with small diameters cannot be sufficiently embedded in gaps between CNTs with large diameters since the CNTs with small diameters are too few. Therefore, packing of the plurality of CNTs 11a, 11a, . . . is sparse and excellent strength cannot be obtained. Moreover, based on the packing being sparse, contact areas between the plurality of CNTs 11a, 11a, . . . are small and electroconductivity results in being poor. Hence, by the mean diameter being not smaller than 4 nm, the CNT wire 10 which is excellent in strength and electroconductivity and in which the plurality of CNTs 11a, 11a, . . . are packed at a high density can be obtained. Meanwhile, a lower limit value of the mean diameter is preferably not smaller than 1 nm, still preferably not smaller than 1.2 nm. When the mean diameter is smaller than 1 nm, the CNTs with small diameters tend to be oriented at random since the CNTs with small diameters are too many, and accordingly, the CNTs with small diameters are scarcely sufficiently embedded in the gaps between CNTs with large diameters. Therefore, there can be a case where the packing of the plurality of CNTs 11a, 11a, . . . is sparse and high strength cannot be obtained.

For the plurality of CNTs 11a, 11a, . . . , a CV value (coefficient of variation) of the mean diameter is not smaller than 0.18, preferably not smaller than 0.50. Herein, the CV value of the mean diameter means a degree of a standard deviation with respect to the mean diameter, and specifically, denotes a ratio of (dispersion of values of the mean diameter)$^{1/2}$ relative to the mean diameter of the plurality of CNTs 11a, 11a, . . . . The CV value can be calculated by expression (2) below, a smaller CV value means that the plurality of CNTs 11a, 11a, . . . more tend to be monodisperse, and a larger CV value means that the plurality of CNTs 11a, 11a, . . . more tend to be polydisperse. Since the CV value being smaller than 0.18 indicates being too monodisperse and a dispersion of diameters is small, CNTs with small diameters cannot be sufficiently embedded in gaps between CNTs with large diameters. Therefore, packing of the plurality of CNTs 11a, 11a, . . . is sparse and excellent strength cannot be obtained. Moreover, since based on the packing being sparse, contact areas between the plurality of CNTs 11a, 11a, . . . are small, electroconductivity results in being poor. Therefore, by the CV value of the mean diameter being not smaller than 0.18, the CNT wire 10 which is excellent in strength and electroconductivity and in which the plurality of CNTs 1a, 11a, . . . are packed at a high density can be obtained. Moreover, when the CV value of the mean diameter is not smaller than 0.50, packing of the plurality of CNTs 11a, 11a, . . . is denser and a further higher density can be achieved. Meanwhile, an upper limit value of the CV value is preferably not larger than 0.80. Since when the CV value is larger than 0.80, a dispersion of diameters is too large despite of polydispersion, the plurality of CNTs 11a, 11a, . . . scarcely have a dose packed structure, and accordingly, gaps between portions where CNTs with large diameters gather tend to be large. Therefore, dense packing tends to be difficult, high strength tends to be scarcely obtained, and furthermore when contact areas between the plurality of CNTs 11a, 11a, . . . are small, high electroconductivity tends to be scarcely obtained.

$$\text{CV value of the mean diameter=standard deviation÷mean diameter} \quad (2)$$

Figure 3:
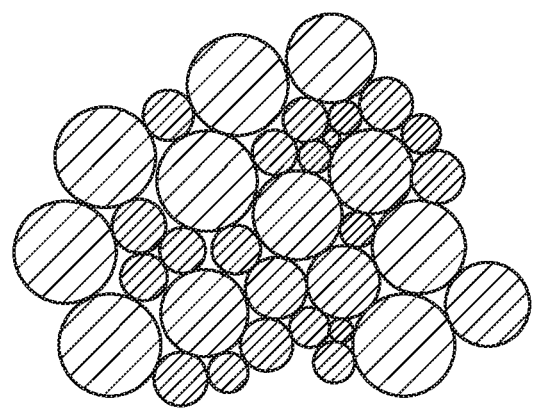
FIG. 3 is a schematic view exemplarily showing a state where carbon nanotubes with different diameters are dispersed in a carbon nanotube wire according to an exemplary embodiment of the present disclosure.

As above, by controlling the mean diameter and the CV value of values of the mean diameter for the plurality of CNTs 11a, 11a, . . . , as exemplarily shown in FIG. 3, CNTs with small diameters can be appropriately embedded in gaps between CNTs with large diameters. Thereby, packing of the plurality of CNTs 11a, 11a, . . . is made dense and excellent strength can be obtained. Moreover, since CNTs with large diameters and CNTs with small diameters moderately contact each other and contact areas between the plurality of CNTs 11a, 11a, . . . increase in a width direction, excellent electroconductivity is given.

Among of combinations of the parameters above, when the CV value of the mean length is not larger than 1.2, the mean diameter is not smaller than 1 nm, the CV value of the mean diameter is not larger than 0.80, and the proportion of carbon nanotubes with lengths not smaller than 3 μm is not more than 95% for the plurality of CNTs 11a, 11a, ..., the CNT wire 10 which is more excellent in electroconductivity and in which the CNT 11a, 11a, ... are packed at a higher density can be obtained. In particular, when the CV value of the mean length is not smaller than 0.70, the mean diameter is not smaller than 1.2 nm, the CV value of the mean diameter is not smaller than 0.50 and not larger than 0.80, and the proportion of carbon nanotubes with lengths not smaller than 3 μm is not less than 70% and not more than 95% for the plurality of CNTs 11a, 11a, ..., the CNT wire 10 in which the CNT 11a, 11a, ... are packed at a very high density can be obtained.

[Arrangement Structure and Density of CNTs]

Thereafter, an arrangement structure and a density of the plurality of CNTs 11a constituting the CNT aggregate 11 are described.

Figure 4:
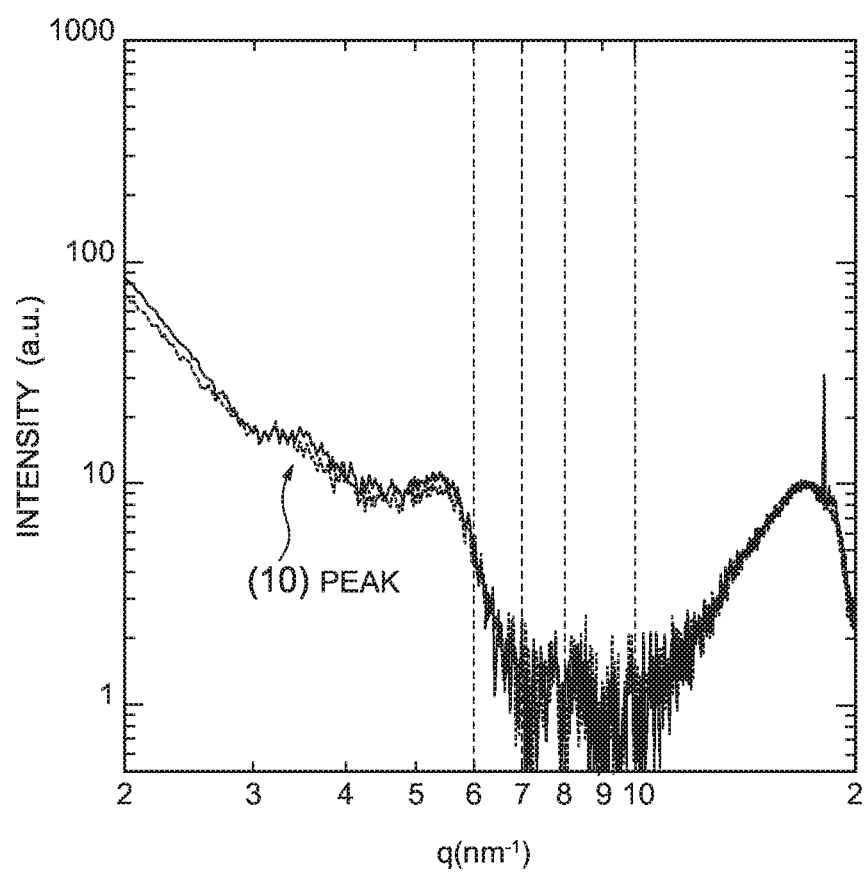
FIG. 4 is a graph showing relation of q value-intensity from WAXS of a plurality of carbon nanotubes constituting a carbon nanotube aggregate.
Figure 5A:
FIG. 5A is a schematic view exemplarily showing a long carbon nanotube.
Figure 5B:
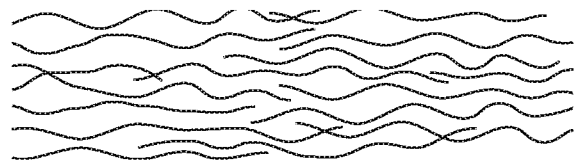
FIG. 5B is a schematic view exemplarily showing a state where only long carbon nanotubes are oriented.
Figure 6A:
FIG. 6A is a schematic view exemplarily showing a short carbon nanotube.
Figure 6B:
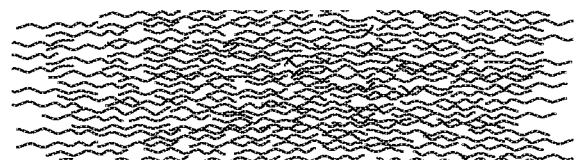
FIG. 6B is a schematic view exemplarily showing a state where only short carbon nanotubes are oriented.

FIG. 4 is a graph showing relation of q value-intensity from WAXS (wide-angle X-ray scattering) of the plurality of CNTs 11a, 11a, ... constituting the CNT aggregate 11.

WAXS is suitable for evaluating a structure and the like of a substance with a size not larger than nanometers. For example, by analyzing information of an X-ray scattering image by the following method using WAXS, a density of CNTs 11a the outer diameters of which are not larger than nanometers can be evaluated. As shown in FIG. 4 as a result of analyzing relation between a scattering vector q and an intensity on any one CNT aggregate 11, a value of a lattice constant estimated from a q value of the peak top of a (10) peak shown approximately at q=3.0 $nm^{-1}$ to 4.0 $nm^{-1}$ is measured. It can be examined, based on this measurement value of the lattice constant and a diameter of the CNT aggregate observed by Raman spectroscopy, TEM or the like, that the CNTs 11a, 11a, ... form a hexagonal close packed structure in plane view. It can be accordingly said that a diameter distribution of the plurality of CNT aggregates in the CNT wire 10 is narrow, and the plurality of CNTs 11a, 11a, ... are arranged with regularity, that is, have a high density, and thereby, form a hexagonal close packed structure to exist with such a high density. As above, heat of the CNT wire 10 is easily dissipated while being smoothly transmitted along the longitudinal directions of the CNT aggregates 11 since the plurality of CNT aggregates 11, 11, ... have excellent orientation, and furthermore, the plurality of CNTs 11a, 11a, ... constituting the CNT aggregates 11 are arranged with regularity to be arranged with a high density. Accordingly, the CNT wire 10 achieves more excellent heat dissipation characteristics than a metal-made core wire since a heat dissipation route can be adjusted over the longitudinal direction and a radial, sectional direction by adjusting an arrangement structure or a density of the aforementioned CNT aggregates 11 and CNTs 11a.

In view of further improving heat dissipation characteristics by obtaining a high density, it is preferable for the q value of the peak top in the (10) peak of intensity by X-ray scattering indicating a density of the plurality of CNTs 11a, 11a, ... to be not smaller than 2.0 $nm^{-1}$ and not larger than 5.0 $nm^{-1}$, and still preferable for a full-width at half maximum Δq (FWHM) to be not smaller than 0.1 $nm^{-1}$ and not larger than 2.0 $nm^{-1}$.

[Method for Manufacturing CNT Wire]

The CNTs 11a can be prepared by a method such as a floating catalyst method (Japanese Patent No. 5819888) and a substrate method (Japanese Patent No. 5590603). For example, short CNTs can be prepared by the floating catalyst method, and long CNTs can be prepared by the substrate method. Then, using dispersion liquid containing the plurality of CNTs 11a, 11a, ... with a predetermined dispersion in diameter and length, the obtained dispersion liquid (CNT aggregates 11) is coagulated, and thereby, a coagulate for preparing the CNT wire 10 is obtained.

An element wire of the CNT wire 10 can be prepared using the coagulate containing the CNT aggregates 11 by a method such as dry spinning (Japanese Patent No. 5819888, Japanese Patent No. 5990202 or Japanese Patent No. 5350635), wet spinning (Japanese Patent No. 5135620, Japanese Patent No. 5131571 or Japanese Patent No. 5288359), or liquid crystal spinning (Japanese Translation of PCT International Application Publication No. 2014-530964).

Moreover, the orientation of the CNT aggregates 11 and the CNTs 11a and the arrangement structure and the density of the CNTs 11a can be adjusted by properly selecting a spinning method such as the dry spinning, the wet spinning and the liquid crystal spinning, and spinning conditions of the spinning method.

<Characteristics>

[Electroconductivity]

For a CNT wire according to the present disclosure, a volume resistivity as the electroconductivity is preferably lower than 8.0×$10^{-5}$ Ω·cm, still preferably lower than 4.0× $10^{-5}$ M Ω·cm, further preferably lower than 1.0×$10^{-5}$ Ω·cm. When the volume resistivity is lower than 8.0×$10^{-5}$ Ω·cm, the CNT wire can be evaluated as having excellent electroconductivity.

[Density]

For a CNT wire according to the present disclosure, a density is preferably not smaller than 0.5 g/$cm^3$, still preferably not smaller than 1.4 g/$cm^3$, further preferably not smaller than 1.6 g/$cm^3$. When the density is not smaller than 0.5 g/$cm^3$, the CNTs can be evaluated as being packed at a high density.

[Strength]

For a CNT wire according to the present disclosure, tensile strength is preferably not smaller than 400 MPa, still preferably 450 MPa, further preferably 500 MPa. When the tensile strength is not smaller than 400 MPa, the CNT wire can be evaluated as having excellent strength.

CNT wires according to the present disclosure can be used as conductors constituting electric wires as electric power lines and signal lines in various fields of automobiles, electric devices, control devices and the like, and in particular, are suitable for use as conductors of general electric wires for wire harnesses, motors, and the like for vehicles.

EXAMPLES

While the present disclosure will be hereinafter described more in detail based on examples, the present disclosure is not limited to these.

<Preparation of CNT Wires>

CNT wires for Examples 1 to 11 and Comparative Examples 1 to 5 were prepared as follows.

Examples 1 to 11 and Comparative Examples 1 to 5

Short CNTs having predetermined lengths prepared by the floating catalyst method, and long CNTs having predetermined lengths prepared by the substrate method were individually produced. Each of the obtained CNTs were centrifuged and were fractionated with filters, and thereby, dispersion liquids of a plurality of CNT samples with different diameters and lengths were produced. Mean diameters of the fractionated plurality of CNT samples were measured, and by mixing dispersion liquids of CNT samples having predetermined mean diameters, the CV value of the mean diameter was adjusted. Mean lengths of the fractionated plurality of CNT samples were measured, and by mixing dispersion liquids of CNT samples having predetermined mean lengths, the CV value of the mean length and the proportion of CNTs with lengths not smaller than 3 μm were adjusted. A coagulate obtained from dispersion liquid in which the length and the size of the diameter were adjusted as above was spun by wet spinning, and thereby, an element wire (single wire) of a CNT wire with 0.1 mm of equivalent circle diameter was obtained.

<Measurement Items>

The lengths and the diameters of the CNTs used for Examples 1 to 11 and Comparative Examples 1 to 5 were measured as follows.

[Mean Length]

The mean length of CNTs was calculated based on a SEM (scanning electron microscope) image or an AFM (atomic force microscope) image using a SEM or an AFM. Specifically, a Si substrate on which CNT dispersion liquid was dropped was observed on the AFM image. The observation was performed with a scanning mode being a dynamic mode and with 30 μm×30 μm of scanning range. When existence of CNTs with lengths exceeding 30 μm was observed, observation with the SEM was performed. The substrate used for the AFM observation was used as it was. The observation was performed with 1 kV of acceleration voltage and a magnification of 1000, and a distance between two points on a CNT (longitudinal length) was measured. This was similarly performed also on the other CNTs, and a mean value of longitudinal lengths of 200 CNTs was calculated as the mean length.

[CV Value of Mean Length]

The CV value of the mean length was calculated by expression (1) below. Specifically, the AFM image and the SEM image acquired in the measurement of the mean length were read by ImageJ, and the calculation was performed based on the values obtained by measuring the longitudinal lengths on the 200 CNTs similarly to the mean length.

$$\text{CV value of the mean length} = \text{standard deviation} \div \text{mean length} \quad (1)$$

[Proportion of CNTs with Lengths not Smaller than 3 μm]

The proportion of CNTs with lengths not smaller than 3 μm was calculated based on the SEM image and the AFM image acquired in the measurement of the mean length. Specifically, similarly to the measurement of the dispersion, the AFM image or the SEM image was read by ImageJ, lengths of 200 CNTs were measured, and the proportion of lengths not smaller than 3 μm was calculated.

[Mean Diameter]

The mean diameter of CNTs was calculated based on a TEM (transmission electron microscope) image using a TEM. Specifically, CNT dispersion liquid was dropped on a Cu grid, was observed with 200 kV of acceleration voltage and a magnification of 0.2 million, and the line connecting ends perpendicular to the longitudinal direction of a CNT (lengthwise direction) on a lateral surface of the CNT in the width direction (lateral surface in the radial direction) was observed as the diameter. This was similarly performed also on the other CNTs, and a mean value of diameters of 200 CNTs was calculated as the mean diameter.

[CV Value of Mean Diameter]

The CV value of the mean diameter was calculated by expression (2) below. Specifically, the TEM image was read by ImageJ, and the calculation was performed based on the values obtained by measuring the diameters on the 200 CNTs similarly to the mean diameter.

$$\text{CV value of the mean diameter} = \text{standard deviation} \div \text{mean diameter} \quad (2)$$

<Evaluation Items>

Evaluations below were performed for the CNT wires prepared as above.

[Electroconductivity]

As the evaluation of electroconductivity of the CNT wire, volume resistivity was measured by a four-terminal method. Specifically, the CNT wire was connected to a resistance measuring device and resistance measurement was performed by the four-terminal method. The volume resistivity r was calculated based on a calculation formula of $r=RA/L$ (R: resistance, A: sectional area of the CNT wire, and L: measurement length). A case of the volume resistivity being lower than $1.0 \times 10^{-5}$ Ω·cm was evaluated as "Excellent", a case of being not lower than $1.0 \times 10^{-5}$ Ω·cm and lower than $4.0 \times 10^{-5}$ Ω·cm as "Good", a case of being not lower than $4.0 \times 10^{-5}$ Ω·cm and lower than $8.0 \times 10^{-5}$ Ω·cm as "Fair", and a case of being not lower than $8.0 \times 10^{-5}$ Ω·cm as "Poor".

[Density]

As the evaluation of a density of the CNT wire, the density was measured by a sink-float method. Specifically, the measurement was performed by adjusting a ratio between sodium polytungstate and water, putting the CNT wire into the solution, and evaluating sinking and floating. A case of the density being not lower than 1.6 g/cm$^3$ was evaluated as "Excellent", a case of being not lower than 1.4 g/cm$^3$ and lower than 1.6 g/cm$^3$ as "Good", a case of being not lower than 0.5 g/cm$^3$ and lower than 1.4 g/cm$^3$ as "Fair", and a case of being lower than 0.5 g/cm$^3$ as "Poor".

[Strength]

As the evaluation of strength of the CNT wire, tensile strength was measured. Specifically, the tensile strength of the CNT wire was measured by tensile testing with a universal testing machine. The measurement was performed with 100 N of load cell and 6 mm/min of testing speed. The sectional area was obtained from the diameter of the CNT wire which could be observed by a microscope. The tensile strength was calculated based on a calculation formula of $s=F/A$ (s: tensile strength, F: testing force, and A: sectional area of the CNT wire). A case of the tensile strength being not lower than 500 MPa was evaluated as "Excellent", a case of being not lower than 450 MPa and lower than 500 MPa as "Good", a case of being not lower than 400 MPa and lower than 450 MPa as "Fair", and a case of being lower than 400 MPa as "Poor".

The measurements and the evaluation results of the CNT wires prepared are presented in Table 1 below.

TABLE 1

Results of Measurement of Lengths and Diameters of CNTs

|  | CV Value of Mean Length [—] | Proportion of CNTs Not Shorter Than 3 μm [%] | Mean Diameter [nm] | CV Value of Mean Diameter [—] | Evaluation Items | | |
|---|---|---|---|---|---|---|---|
| Mean Length [μm] | | | | | Volume Resistivity | Density | Tensile Strength |
| Example 1 | 8 | 0.7 | 80 | 1.2 | 0.5 | Good | Excellent | Excellent |
| Example 2 | 1.2 | 0.8 | 65 | 1.3 | 0.7 | Good | Excellent | Good |
| Example 3 | 24 | 0.7 | 70 | 1.5 | 0.7 | Excellent | Excellent | Excellent |
| Example 4 | 7 | 1.2 | 70 | 2 | 0.3 | Good | Good | Good |
| Example 5 | 15 | 0.7 | 80 | 3.5 | 0.5 | Good | Excellent | Excellent |
| Example 6 | 70 | 0.7 | 70 | 1.5 | 0.7 | Excellent | Excellent | Excellent |
| Example 7 | 24 | 0.7 | 92 | 1.5 | 0.7 | Good | Excellent | Excellent |
| Example 8 | 24 | 0.7 | 70 | 1.5 | 0.78 | Excellent | Excellent | Good |
| Example 9 | 24 | 0.7 | 96 | 1.5 | 0.7 | Fair | Fair | Good |
| Example 10 | 24 | 0.7 | 70 | 1.5 | 0.88 | Fair | Fair | Fair |
| Example 11 | 24 | 0.4 | 70 | 1.5 | 0.7 | Good | Good | Good |
| Comparative Example 1 | 0.8 | 0.6 | 20 | 1 | 0.4 | Poor | Poor | Poor |
| Comparative Example 2 | 200 | 0.6 | 85 | 3.5 | 0.3 | Poor | Poor | Poor |
| Comparative Example 3 | 3 | 0.2 | 70 | 2 | 0.7 | Poor | Poor | Poor |
| Comparative Example 4 | 10 | 0.6 | 60 | 5 | 0.5 | Poor | Poor | Poor |
| Comparative Example 5 | 4 | 0.6 | 75 | 3 | 0.1 | Poor | Poor | Poor |

As presented in Table 1, in any of Examples 1 to 11 according to the present disclosure using a plurality of CNTs with a predetermined dispersion in diameter and length, the CNT wire which was excellent in strength and electroconductivity and in which the CNTs were packed at a high density was obtained. Examples 1 to 8 and 11 are more excellent in electroconductivity and density, and particularly in each of Examples 1 to 3 and 5 to 8, the CNTs were packed at a very high density.

On the other hand, in any of Comparative Examples 1 to 5 in which any one or two or more of the mean length, the CV value of the mean length, the mean diameter, the CV value of the mean diameter, and the proportion of carbon nanotubes with lengths not smaller than 3 μm were out of the ranges that the present disclosure was applicable to, all of the electroconductivity, the strength and the density were poor.

What is claimed is:

1. A carbon nanotube wire comprising a carbon nanotube aggregate constituted of a plurality of carbon nanotubes, wherein
   in the plurality of carbon nanotubes, a mean length of the plurality of carbon nanotubes is not larger than 150 μm, a coefficient of variation (CV) value of the mean length is not smaller than 0.40, a mean diameter of the plurality of carbon nanotubes is smaller than 4 nm, a CV value of the mean diameter is not smaller than 0.3 and not larger than 0.88, and a proportion of carbon nanotubes with lengths not smaller than 3 μm is not less than 60%.

2. The carbon nanotube wire according to claim 1, wherein the mean length of the plurality of carbon nanotubes is not smaller than 1 μm.

3. The carbon nanotube wire according to claim 1, wherein a density in the carbon nanotube wire is not lower than 0.5 g/cm$^3$.

4. The carbon nanotube wire according to claim 1, wherein in the plurality of carbon nanotubes, the CV value of the mean length is not larger than 1.2, the mean diameter is not smaller than 1 nm, the CV value of the mean diameter is not larger than 0.80, and the proportion of carbon nanotubes with lengths not smaller than 3 μm is not more than 95%.

5. The carbon nanotube wire according to claim 1, wherein in the plurality of carbon nanotubes, the CV value of the mean length is not smaller than 0.70, the mean diameter is not smaller than 1.2 nm, the CV value of the mean diameter is not smaller than 0.50 and not larger than 0.80, and the proportion of carbon nanotubes with lengths not smaller than 3 μm is not less than 70% and not more than 95%.

6. The carbon nanotube wire according to claim 1, wherein the carbon nanotube wire is a single wire.

\* \* \* \* \*